Nov. 21, 1939.　　　　J. B. MILLIGAN　　　　2,180,426

PORTABLE COLLAPSIBLE SEAT

Filed Aug. 16, 1937

INVENTOR.
John B. Milligan
BY A. B. Bowman
ATTORNEY.

Patented Nov. 21, 1939

2,180,426

UNITED STATES PATENT OFFICE 2,180,426

PORTABLE COLLAPSIBLE SEAT

John B. Milligan, San Diego, Calif.

Application August 16, 1937, Serial No. 159,376

1 Claim. (Cl. 155—153)

My invention relates to portable collapsible seats and the objects of my invention are:

First, to provide a light seat that can be readily carried in the hand to be used in a grandstand, beach, or the like;

Second, to provide such a seat that is provided with a back rest as well as a cushion bottom portion;

Third, to provide a seat of this class which is collapsible into very compact form for carrying;

Fourth, to provide a seat of this class which is very comfortable;

Fifth, to provide a seat of this class which is easy to construct, efficient in its action, durable, and which will not readily deteriorate or get out of order.

Figure 1:
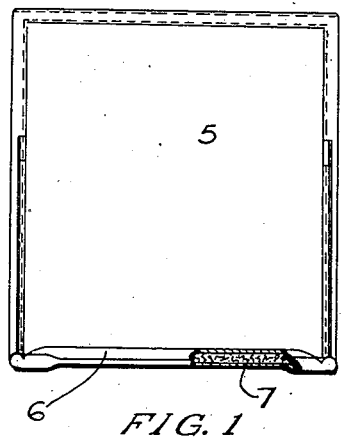
Figure 2:
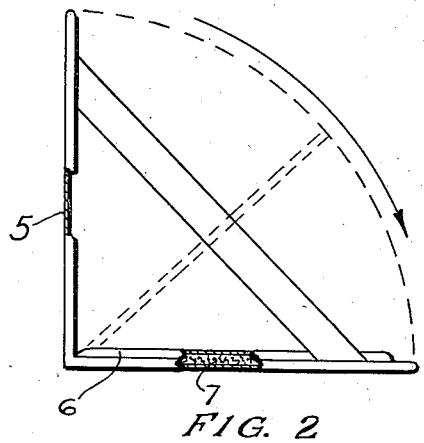
Figure 3:
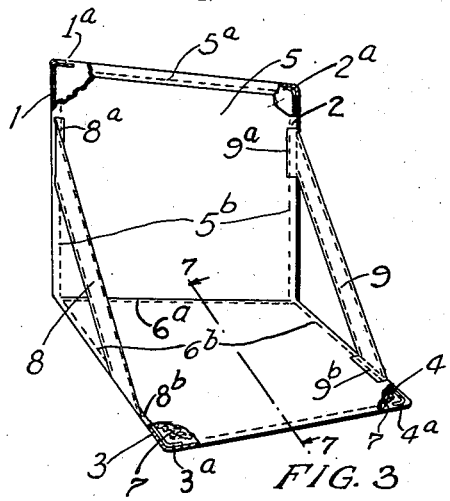
Figure 4:
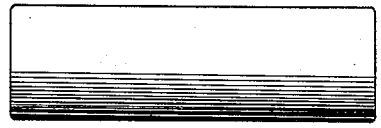
Figure 7:
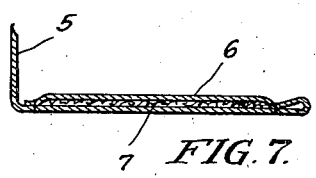
Figure 5:
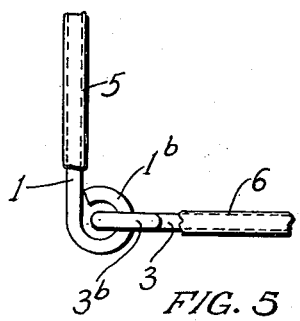
Figure 6:
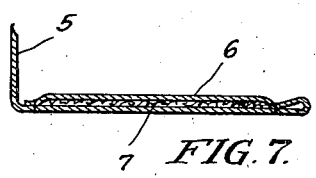

With these and other objects in view as will appear hereinafter, my invention consists of certain novel features of construction, combination, and arrangement of parts and portions as well as hereinafter described in detail and particularly set forth in the appended claims reference being had to the accompanying drawings and to the characters of reference thereon which form a part of this application in which:

Figure 1 is a front elevational view of my seat shown in open position ready for use showing a portion broken away and in section to facilitate the illustration; Fig. 2 is a side elevational view thereof at right angles to that of Fig. 1 and showing portions broken away and in section to facilitate the illustration; Fig. 3 is a perspective view of my seat in open position, showing some of the portions broken away to facilitate the illustration; Fig. 4 is a side elevational view of the seat when folded and rolled in position for carrying; Fig. 5 is an enlarged fragmentary view of two of the side members, and their connecting portions with portions broken away to facilitate the illustration; Fig. 6 is a similar top view of said fragmentary portion shown in Fig. 5 and Fig. 7 is a sectional view taken from the line 7—7 of Fig. 3.

Similar characters of reference refer to similar parts and portions throughout the several views of the drawing.

The side members 1, 2, 3, and 4, seat back member 5, seat bottom portion 6, seat padding 7 and brace strips 8 and 9, constitute the principal parts and portions of my portable collapsible seat.

The back side member 1 is made of wire provided with a right angle turn portion 1a at one end, then extends downwardly the height of the back portion 5 and is provided with a loop 1b on its lower end shown best in Fig. 5 of the drawing, it being noted that the loop portion 1b is straight at its intersection with the back portion so that the back member will fold over against the member 3 in close relation. The member 3 is also provided with a short right angle turn portion 3a shown best in Fig. 3 of the drawing and with a seat portion which extends along one side of the seat bottom portion and connects with the loop portion of member 1 by a loop member 3b shown best in Figs. 5 and 6 of the drawing.

The side member 2 is exactly the same as the side member 1 but positioned in the reverse direction. It is provided with a short right angle turn portion 2a at its normally upper end and with a loop portion similar to the loop portion 1b at its lower end. The side member 4 is also provided with a short right angle turn 4a at its forward end and with a loop portion at the other end similar to the loop portion of the member 2. This forms hinged frame members consisting of the members 1 and 3 and 2 and 4, hinged by means of the loops so that they will fold one against the other. Secured to the side members 1 and 2 by being looped around them is the seat back member 5 which is preferably made of a strong fabric such as canvas. It is folded over at its upper side at 5a and arranged to fit around the ends 1a and 2a of the side members 1 and 2 and is positioned around the side members 1 and 2 and sewed at 5b. This is made of canvas and extends downward by and around the loop portions of the side members and out to the ends of the members 3 and 4. Then the material is turned back around the ends 3a and 4a and then extends backwardly to near the lower end of the back member 5 at 6a and between this upper and lower member is provided the seat padding 7 shown best in Figs. 1 and 2 of the drawing. The sides of the member 6 are sewed around the straight portions of the side members 3 and 4 and sewed at 6b.

In order to keep the back members from spreading too far from the seat bottom 6, there are provided brace strips 8 and 9 which are composed of double fabric substantially the same as that used for the back and bottom portion of the seat, and the member is secured to the back members near the side member 1 at 8a and the other end is secured to the bottom portion at 8b by folding and sewing the same. While the member 9 is secured to the back member at 9a and to the bottom member at 9b in the same manner. These strip members being flexible, permit the back to fold down against the seat bottom portion but prevent the back from spreading too far backwardly relative to the seat bottom portion. The side members 1, 2, 3, and 4, form reinforcing at the side edges and form the hinging members between the seat bottom portion and the back member.

The operation of my portable collapsible seat is as follows: The seat when it is ready for use is in open position, shown best in Fig. 3 of the drawing, with the padded side down to form the seat bottom and the person sits on this bottom portion and rests his back against the back member 5. When it is desired to move to another place, the back member 5 is folded down against the bottom portion 6 as shown by dash line in Fig. 2, the strips 8 and 9 being folded in between the back member and bottom portion. Then, after the parts are folded together, the whole is rolled from one side into a rolled form as shown in Fig. 4 of the drawing and may be readily carried in the hand, or if the person has a large pocket, may be carried in the pocket.

Though I have shown and described a particular construction, combination, and arrangement of parts and portions, I do not wish to be limited to this particular construction, combination, and arrangement but desire to include in the scope of my invention the construction, combination, and arrangement substantially as set forth in the appended claim.

Having thus described my invention, what I claim as new and desire to secure by Letters Patent is:

In a portable collapsible seat, a pair of side members provided with hinged loop portions connecting the same together at their inner ends, another similar pair of side members positioned in spaced relation and substantially parallel therewith, and flexible fabric members of suitable width secured to said side members at the sides, extending the full length of said side members, the fabric member between two of said side members forming a seat bottom member and the fabric member between the other two members forming a back member and flexible brace strips connecting the upper portion of said back member with the forward portion of said bottom member at the side members, the outer end of each of said side members being provided with a short right angle turn.

JOHN B. MILLIGAN.